(12) United States Patent
Park et al.

(10) Patent No.: US 9,620,789 B2
(45) Date of Patent: Apr. 11, 2017

(54) BATTERY PACK OF THE STAIR-LIKE STRUCTURE

(71) Applicant: LG Chem, Ltd., Seoul (KR)

(72) Inventors: Chan Ki Park, Daejeon (KR); Soonho Ahn, Seoul (KR); Ki-Woong Kim, Daejeon (KR); Jung Shik Oh, Cheongju-Si (KR); Jun Seo Yun, Daejeon (KR)

(73) Assignee: LG Chem, Ltd. (KR)

( * ) Notice: Subject to any disclaimer, the term of this patent is extended or adjusted under 35 U.S.C. 154(b) by 540 days.

(21) Appl. No.: 14/103,233

(22) Filed: Dec. 11, 2013

(65) Prior Publication Data

US 2014/0157584 A1 Jun. 12, 2014

Related U.S. Application Data

(63) Continuation of application No. 13/793,762, filed on Mar. 11, 2013, which is a continuation of application No. PCT/KR2013/001815, filed on Mar. 6, 2013.

(30) Foreign Application Priority Data

Mar. 8, 2012 (KR) ........................ 10-2012-0024142

(51) Int. Cl.
| | | |
|---|---|---|
| *H01M 6/46* | (2006.01) | |
| *H01M 10/04* | (2006.01) | |
| *H01M 2/10* | (2006.01) | |
| *H01M 2/02* | (2006.01) | |

(52) U.S. Cl.
CPC ........... *H01M 6/46* (2013.01); *H01M 2/1016* (2013.01); *H01M 10/04* (2013.01); *H01M 10/0472* (2013.01); *H01M 2/0275* (2013.01); *Y10T 29/49108* (2015.01); *Y10T 29/49826* (2015.01)

(58) Field of Classification Search
CPC .... H01M 10/04; H01M 6/46; H01M 10/0472; H01M 2/1016; H01M 2/0275; Y10T 29/49826; Y10T 29/49108
See application file for complete search history.

(56) References Cited

U.S. PATENT DOCUMENTS

| | | |
|---|---|---|
| 2,702,310 A | 2/1955 | Kaye et al. |
| 3,442,717 A | 5/1969 | Horn et al. |
| 4,092,464 A | 5/1978 | Dey et al. |

(Continued)

FOREIGN PATENT DOCUMENTS

| | | |
|---|---|---|
| CN | 1314008 A | 9/2001 |
| CN | 1363121 A | 8/2002 |

(Continued)

OTHER PUBLICATIONS

Inernational Search Report for Application No. PCT/KR2013/001815 dated Jun. 27, 2013.

(Continued)

*Primary Examiner* — Muhammad Siddiquee
(74) *Attorney, Agent, or Firm* — Lerner, David, Littenberg, Krumholz & Mentlik, LLP

(57) ABSTRACT

Disclosed herein is a battery pack including secondary batteries which can be charged and discharged. The battery pack is configured such that secondary batteries having different sizes are stacked to form a stair-like structure having a width and a height.

25 Claims, 7 Drawing Sheets

(56) References Cited

U.S. PATENT DOCUMENTS

| | | | |
|---|---|---|---|
| 4,964,877 A | 10/1990 | Keister et al. | |
| 5,582,931 A * | 12/1996 | Kawakami | H01M 6/40 |
| | | | 429/127 |
| 5,633,097 A | 5/1997 | Miller | |
| 5,652,074 A | 7/1997 | Larson, III et al. | |
| 6,040,078 A | 3/2000 | Fauteux et al. | |
| 6,224,995 B1 | 5/2001 | Fauteux et al. | |
| 6,300,002 B1 | 10/2001 | Webb et al. | |
| 6,423,449 B1 * | 7/2002 | Hong | H01M 2/18 |
| | | | 429/129 |
| 6,498,951 B1 | 12/2002 | Larson et al. | |
| 6,610,443 B2 | 8/2003 | Paulot et al. | |
| 6,946,220 B2 | 9/2005 | Probst et al. | |
| 7,285,334 B1 | 10/2007 | Yamashita et al. | |
| 7,479,349 B2 | 1/2009 | O'Phelan et al. | |
| 7,595,132 B2 | 9/2009 | Kang et al. | |
| 9,246,185 B2 * | 1/2016 | Kretschmar | H01M 10/0431 |
| 2001/0005561 A1 | 6/2001 | Yamada et al. | |
| 2002/0119367 A1 | 8/2002 | Watanabe et al. | |
| 2002/0122975 A1 | 9/2002 | Spillman et al. | |
| 2002/0160257 A1 | 10/2002 | Lee et al. | |
| 2003/0013012 A1 | 1/2003 | Ahn et al. | |
| 2003/0039883 A1 | 2/2003 | Notten et al. | |
| 2003/0077509 A1 | 4/2003 | Probst et al. | |
| 2004/0119442 A1 * | 6/2004 | Lee | H02J 7/0042 |
| | | | 320/112 |
| 2005/0164094 A1 | 7/2005 | Kotato et al. | |
| 2005/0214642 A1 | 9/2005 | Kim et al. | |
| 2006/0172185 A1 | 8/2006 | Mimura | |
| 2006/0269842 A1 | 11/2006 | Ichinose et al. | |
| 2006/0275661 A1 | 12/2006 | Kim et al. | |
| 2006/0286456 A1 | 12/2006 | Fu et al. | |
| 2007/0054180 A1 | 3/2007 | Miyajima et al. | |
| 2007/0059595 A1 | 3/2007 | Endo et al. | |
| 2007/0099078 A1 | 5/2007 | Zhang et al. | |
| 2007/0202401 A1 | 8/2007 | Viavattine | |
| 2007/0218355 A1 | 9/2007 | Ryu et al. | |
| 2007/0287064 A1 | 12/2007 | Suzuki et al. | |
| 2008/0137890 A1 | 6/2008 | Petersen et al. | |
| 2009/0023057 A1 * | 1/2009 | Kim | H01M 2/0207 |
| | | | 429/120 |
| 2009/0075168 A1 | 3/2009 | Lee | |
| 2009/0123829 A1 * | 5/2009 | Kim | H01M 2/1022 |
| | | | 429/150 |
| 2009/0159582 A1 | 6/2009 | Chami et al. | |
| 2010/0047685 A1 | 2/2010 | Lee et al. | |
| 2010/0112451 A1 | 5/2010 | Shibutani et al. | |
| 2010/0279161 A1 | 11/2010 | Kang et al. | |
| 2010/0319187 A1 | 12/2010 | Kim et al. | |
| 2011/0052952 A1 | 3/2011 | Roh et al. | |
| 2011/0183183 A1 * | 7/2011 | Grady | H01M 2/1022 |
| | | | 429/152 |
| 2011/0274955 A1 | 11/2011 | Park et al. | |
| 2011/0287308 A1 | 11/2011 | Kim et al. | |
| 2012/0015223 A1 | 1/2012 | Bhardwaj et al. | |
| 2012/0015236 A1 | 1/2012 | Spare | |
| 2012/0107654 A1 | 5/2012 | Bhardwaj et al. | |
| 2012/0129037 A1 | 5/2012 | Hohenthanner et al. | |
| 2012/0135299 A1 | 5/2012 | Kwon et al. | |
| 2012/0156551 A1 | 6/2012 | Cho | |
| 2012/0183825 A1 | 7/2012 | Lee et al. | |
| 2012/0202105 A1 | 8/2012 | Shinyashiki et al. | |
| 2012/0225345 A1 | 9/2012 | Kim | |
| 2013/0019732 A1 | 1/2013 | Yotsumoto | |
| 2013/0108906 A1 | 5/2013 | Bhardwaj et al. | |
| 2013/0144167 A1 | 6/2013 | Lee et al. | |
| 2013/0344360 A1 | 12/2013 | Miyajima et al. | |
| 2014/0093762 A1 | 4/2014 | Goh et al. | |

FOREIGN PATENT DOCUMENTS

| | | |
|---|---|---|
| CN | 1799162 A | 7/2006 |
| CN | 101107736 A | 1/2008 |
| EP | 1309018 A2 | 5/2003 |
| EP | 1326680 A1 | 7/2003 |
| EP | 1416571 A1 | 5/2004 |
| JP | 02-056856 | 2/1990 |
| JP | 05-234598 | 9/1993 |
| JP | 06-260209 | 9/1994 |
| JP | 08-171930 | 7/1996 |
| JP | 09-063591 | 3/1997 |
| JP | 09-082361 | 3/1997 |
| JP | H10188938 A | 7/1998 |
| JP | 10-270014 | 10/1998 |
| JP | H10296879 A | 11/1998 |
| JP | 2000133317 A | 5/2000 |
| JP | 2001028275 A | 1/2001 |
| JP | 2001-167743 A | 6/2001 |
| JP | 2001167743 A | 6/2001 |
| JP | 2001357892 A | 12/2001 |
| JP | 2002199910 A | 7/2002 |
| JP | 2002252023 A | 9/2002 |
| JP | 2002260600 A | 9/2002 |
| JP | 2002-343350 A | 11/2002 |
| JP | 2003217601 A | 7/2003 |
| JP | 2003523060 A | 7/2003 |
| JP | 2003234094 A | 8/2003 |
| JP | 2003303622 A | 10/2003 |
| JP | 2004111219 A | 4/2004 |
| JP | 3611765 B2 | 1/2005 |
| JP | 2005169728 A | 6/2005 |
| JP | 3680797 B2 | 8/2005 |
| JP | 2006127882 A | 5/2006 |
| JP | 2006134604 A | 5/2006 |
| JP | 2006236994 A | 9/2006 |
| JP | 2006-278331 A | 10/2006 |
| JP | 2007073207 A | 3/2007 |
| JP | 2008021634 A | 1/2008 |
| JP | 2008300141 A | 12/2008 |
| JP | 2009-218105 A | 9/2009 |
| JP | 2010176980 A | 8/2010 |
| JP | 2011003518 A | 1/2011 |
| JP | 2011081931 A | 4/2011 |
| JP | 2011517831 A | 6/2011 |
| JP | 2011204613 A | 10/2011 |
| KR | 2020000005813 U | 4/2000 |
| KR | 20-0207948 | 1/2001 |
| KR | 1020010055968 A | 7/2001 |
| KR | 20010104150 A | 11/2001 |
| KR | 1020030066960 A | 8/2003 |
| KR | 20040054113 A | 6/2004 |
| KR | 20050020357 A | 3/2005 |
| KR | 20050036466 A | 4/2005 |
| KR | 20060027281 A | 3/2006 |
| KR | 100670492 B1 | 1/2007 |
| KR | 20070066401 A | 6/2007 |
| KR | 1020070075941 A | 7/2007 |
| KR | 1020070099068 A | 10/2007 |
| KR | 20080022915 A | 3/2008 |
| KR | 100829553 B1 | 5/2008 |
| KR | 20080058772 A | 6/2008 |
| KR | 20080095967 A | 10/2008 |
| KR | 10-0866767 B1 | 11/2008 |
| KR | 20090003823 A | 1/2009 |
| KR | 10-0884945 B1 | 2/2009 |
| KR | 20090028243 A | 3/2009 |
| KR | 20090062409 A | 6/2009 |
| KR | 20090097731 A | 9/2009 |
| KR | 100987300 B1 | 10/2010 |
| KR | 20100137290 A | 12/2010 |
| KR | 20110025023 A | 3/2011 |
| KR | 20110105737 A | 9/2011 |
| KR | 20110112241 A | 10/2011 |
| KR | 20110128594 A | 11/2011 |
| KR | 20120060706 A | 6/2012 |
| KR | 20120082808 A | 7/2012 |
| WO | 0072392 A1 | 11/2000 |
| WO | 0243178 A1 | 5/2002 |
| WO | 2012-009423 A1 | 1/2012 |
| WO | 2012053772 A2 | 4/2012 |
| WO | 2013054593 A1 | 4/2013 |

(56) References Cited

FOREIGN PATENT DOCUMENTS

WO      2013141279 A1    9/2013
WO      2013-180378 A1    12/2013

OTHER PUBLICATIONS

International Search Report from PCT/KR2013/002102, dated Jun. 14, 2013.
Extended Search Report from European Application No. 13797719.5, dated Feb. 12, 2016.
International Search Report for Application No. PCT/KR2013/002118 dated Jun. 28, 2013.
International Search Report for Application No. PCT/KR2013/002127 dated Jun. 27, 2013.
Chinese Office Action for Application No. 201380002792.X dated Apr. 3, 2015.
Machine translation of KR 2003-0066960 (Jang).

* cited by examiner

BATTERY PACK OF THE STAIR-LIKE STRUCTURE

CROSS REFERENCE TO RELATED APPLICATIONS

The present application is a continuation of U.S. patent Application Ser. No. 13/793,762, filed on Mar. 11, 2013, which is a continuation of PCT International Application No. PCT/KR2013/001815 filed on Mar. 6, 2013, which claims the benefit of Patent Application No. 10-2012-0024142 filed in the Republic of Korea, on Mar. 8, 2012. The entire contents of all of the above applications are hereby incorporated herein by reference.

TECHNICAL FIELD

The present invention relates to a battery pack including a battery cell stack of secondary batteries which can be charged and discharged.

BACKGROUND ART

With remarkable development of information technology (IT), a great variety of portable information communication devices has been popularized. As a result, in the 21$^{st}$ century, we are moving toward a ubiquitous society in which high-quality information service is possible regardless of time and place.

Meanwhile, lithium secondary batteries are very important to extend such a ubiquitous society. Specifically, lithium secondary batteries, which can be charged and discharged, have been widely used as an energy source for wireless mobile devices. In addition, lithium secondary batteries have also been used as an energy source for electric vehicles and hybrid electric vehicles, which have been proposed to solve problems, such as air pollution, caused by existing gasoline and diesel vehicles using fossil fuel.

As devices, to which the lithium secondary batteries are applicable, are diversified as described above, the lithium secondary batteries have also been diversified such that the lithium secondary batteries can provide powers and capacities suitable for devices to which the lithium secondary batteries are applied. In addition, there is a strong need to reduce the size and weight of lithium secondary batteries.

For example, small-sized mobile devices, such as mobile phones, personal digital assistants (PDAs), digital cameras, and laptop computers, use one or several small-sized, lightweight battery cells for each device according to the reduction in size and weight of the corresponding products.

On the other hand, middle or large-sized devices, such as electric bicycles, electric motorcycles, electric vehicles, and hybrid electric vehicles, use a middle or large-sized battery module (middle or large-sized battery pack) having a plurality of battery cells electrically connected with each other because high power and large capacity are necessary for the middle or large-sized devices. The size and weight of the battery module is directly related to an accommodation space and power of a corresponding middle or large-sized device. For this reason, manufacturers are trying to manufacture small-sized, lightweight battery modules.

A cylindrical battery cell, a prismatic battery cell, and a pouch-shaped battery cell, which are classified based on their shapes, are used as a unit cell of a battery module or battery pack, Especially, the pouch-shaped battery cell, which can be stacked with high integration, has a high energy density per weight, and is inexpensive, has attracted considerable attention.

FIGS. 1A and 1B are exploded perspective views typically showing the general structure of a conventional representative pouch-shaped secondary battery.

Referring to FIG. 1A, a pouch-shaped secondary battery 10 includes an electrode assembly 20 having pluralities of electrode tabs 21 and 22 protruding therefrom, two electrode leads 30 and 31 respectively connected to the electrode tabs 21 and 22, and a battery case 40 to receive the electrode assembly 20 in a sealed state such that portions of the electrode leads 30 and 31 are exposed outward from the battery case 40.

The battery case 40 includes a lower case 42 having a depressed receiving part 41, in which the electrode assembly 20 is located, and an upper case 43 to cover the lower case 42 such that the electrode assembly 20 is sealed in the battery case 40. The upper case 43 and the lower case 42 are connected to each other by thermal welding in a state in which the electrode assembly is mounted therein to form an upper end sealed part 44, side sealed parts 45 and 46, and a lower end sealed part 47.

As shown in FIG. 1A, the upper case 43 and the lower case 42 may be configured as separate members, As shown in FIG. 1B, on the other hand, one end of the upper case 43 may be integrally formed at a corresponding end of the lower case 42 such that the upper case 43 and the lower case 42 may be hingedly connected to each other.

Also, as shown in FIGS. 1A and 1B, the pouch-shaped battery cell is configured to have a structure in which electrode terminals constituted by the electrode tabs and the electrode leads are formed at one end of the electrode assembly. However, a pouch-shaped battery cell configured to have a structure in which electrode terminals are formed at opposite ends of an electrode assembly may also be manufactured using the above method.

DISCLOSURE

Technical Problem

As shown in FIGS. 1A and 1B, a pouch-shaped battery cell is generally manufactured so as to have an almost rectangular parallelepiped structure. A plurality of such pouch-shaped battery cells is stacked to constitute a battery pack having a rectangular parallelepiped structure.

However, a device, to which the battery cell or the battery pack having the rectangular parallelepiped structure is applied, is not generally formed in the shape of a rectangular parallelepiped. For example, sides of a smartphone are curved to improve grip.

In a case in which the battery cell or the battery pack having the rectangular parallelepiped structure is mounted in a device designed so as to have such curved portions, space utilization of the device may be deteriorated.

That is, the curved portions of the device have, dead spaces, in which the battery cell or the battery pack cannot be mounted. Eventually, such dead spaces lower the capacity of the device per volume.

Therefore, the present invention has been made to solve the above problems, and it is an object of the present invention to provide a battery pack wherein the capacity of a device per volume is maximized.

Technical Solution

In accordance with one aspect of the present invention, the above and other objects can be accomplished by the provision of a battery pack including two or more battery cells stacked in a height direction on the basis of a plane, wherein one or more battery cells have the same size as or different sizes than one or more other battery cells and the battery cells having different sizes are stacked to form a one or more stair-like structure having a width and a height.

In the above description, the plane means any plane. That is, the plane may be the ground or a plane perpendicular to the ground. Consequently, the battery cells may be stacked on the ground in the height direction, Alternatively, the battery cells may be stacked on the plane perpendicular to the ground in the height direction.

Hereinafter, the plane may be referred to as the ground for ease of understanding. In this case, the height direction from the plane may be referred to as an antigravity direction, and the direction opposite to the height direction may be referred to as a gravity direction.

For example, "the battery cells are stacked in the height direction on the basis of the plane" in the above description may mean that the battery cells may be stacked from the ground in the gravity direction and/or in the antigravity direction, Consequently, the stacked direction of the battery cells may be the gravity direction and/or in the antigravity direction.

In a case in which the battery cells are stacked in the height direction and in the direction opposite to the height direction, i.e. in opposite directions, on the basis of the plane, the battery cells stacked in the height direction on the basis of the plane and the battery cells stacked in the direction opposite to the height direction on the basis of the plane may be arranged in a symmetrical fashion or in an asymmetrical fashion.

The battery pack may be configured to have a structure in which two or more battery cells are stacked, and electrode terminals of the battery cells are electrically connected to each other. In this case, at least one selected from among a total length, a total width, and a total height of one of the electrode terminals may be different from that of the other electrode terminal or the total length, the total width, and the total height of one of the electrode terminals may be equal to those of the other electrode terminal. Also, the battery cells may be stacked such that the electrode terminals are stacked in an overlapped state to electrically connect the electrode terminals to each other.

The battery pack may include two or more battery cells. In this case, the two or more battery cells may have different sizes. Alternatively, one of the battery cells may have a size different from that of the other battery cells having the same size.

Also, the battery pack may include a combination of two or more battery cells (A) having the same size and two or more battery cells (B) having the same size, the size of the battery cells (B) being different from that of the battery cells (A). Alternatively, the battery pack may include a combination of two or more battery cells (A) having the same size, two or more battery cells (B) having the same size, the size of the battery cells (B) being different from that of the battery cells (A), and two or more battery cells (C) having the same size, the size of the battery cells (C) being different from those of the battery cells (A) and the battery cells (B).

In order to form the stair-like structure, the battery pack according to the present invention may include one or more battery cells have different widths and/or lengths. Battery cells having different sizes may be battery cells having different widths and/or lengths.

The stair-like structure has a width and a height. The width of the stair-like structure may correspond to the difference between the widths or the lengths of the stacked battery cells, and the height of the stair-like structure may be the sum of heights of stairs. The height of each stair may correspond to the height of each of the stacked battery cells.

The stair-like structure may have (i) the same stair height and different widths or (ii) different widths and stair heights, Specifically, a plurality of battery cells having the same length, the same stair height, and different widths, a plurality of battery cells having the same width, the same stair height, and different lengths, or a plurality of battery cells having different widths, lengths, and stair heights may be stacked to form a stair-like structure.

The width and/or stair height of the stair-like structure may be changed based on the radius of curvature of a device in which the battery pack is mounted.

Specifically, in the battery pack according to the present invention, the stair-like structure may be configured such that the stair height is gradually decreased from the lower end to the upper end of the stair-like structure in the height direction on the basis of the plane. The stair-like structure may be configured such that the stair height is gradually increased from the lower end to the upper end of the stair-like structure in the height direction on the basis of the plane. The stair-like structure may be configured such that the width is gradually increased from the lower end to the upper end of the stair-like structure in the height direction on the basis of the plane. The stair-like structure may be configured such that the width is gradually decreased from the lower end to the upper end of the stair-like structure in the height direction on the basis of the plane. The stair-like structure may be configured such that both the width and the stair height are gradually increased or decreased from the lower end to the upper end of the stair-like structure in the height direction on the basis of the plane.

A region at which the stair-like structure is formed is not particularly restricted. Specifically, the stair-like structure may be formed at an electrode terminal non-formation region or an electrode terminal formation region. Alternatively, the stair-like structure may be formed at both the electrode terminal non-formation region and the electrode terminal formation region.

In a case in which the stair-like structure is formed at both the electrode terminal non-formation region and the electrode terminal formation region, the stair-like structure may be formed in the shape of a frustum of a quadrangular pyramid or a frustum of an octagonal pyramid. The frustum of the octagonal pyramid may be a symmetric frustum of an octagonal pyramid or an asymmetric frustum of an octagonal pyramid.

A system component of a device, in which the battery pack is mounted, is located at the stair-like structure.

Each of the battery cells may be a prismatic battery cell, a cylindrical battery cell, or a pouch-shaped battery cell. However, the shape of the battery cells according to the present invention is not particularly restricted, Consequently, the battery pack according to the present invention may include a structure in which the battery cells are stacked in a mixed fashion.

Hereinafter, each of the battery cells may be referred to as a pouch-shaped battery cell configured to have a structure in which a stack of cathodes, separators, and anodes, i.e. an electrode assembly, is received in a cell case, the cell case is sealed by thermal welding after the electrode assembly is impregnated with an electrolyte for ease of understanding. However, the present invention is not limited thereto.

The plate-shaped battery cell may be a pouch-shaped battery cell configured to have a structure in which a stack of cathodes, separators, and anodes, i.e. an electrode assembly, is received in a cell case, the cell case is sealed by thermal welding in a state in which a cathode terminal and an anode terminal protrude outward from the cell case after the electrode assembly is impregnated with an electrolyte.

The cell case may include a receiving part to receive the electrode assembly and a sealed part formed around the receiving part by thermal welding. According to circumstances, the sealed part may be bent toward the receiving part.

In a concrete example, the pouch-shaped battery cell may be a first type pouch-shaped battery cell having a circular structure in plane, a polygonal structure in plane, a polygonal structure in plane, at least one corner of which is curved, or a polygonal structure in plane, at least one side of which is curved, and configured to have a structure in which the cathode terminal and the anode terminal are formed at one end of the battery cell.

In another concrete example, the pouch-shaped battery cell may be a second type pouch-shaped battery cell having a circular structure in plane, a polygonal structure in plane, a polygonal structure in plane, at least one corner of which is curved, or a polygonal structure in plane, at least one side of which is curved, and configured to have a structure in which the cathode terminal and the anode terminal are formed at one end of the battery cell and the other end of the battery cell opposite to one end of the battery cell, respectively.

In a further concrete example, the pouch-shaped battery cell may be a third type pouch-shaped battery cell having a circular structure in plane, a polygonal structure in plane, a polygonal structure in plane, at least one corner of which is curved, or a polygonal structure in plane, at least one side of which is curved, and configured to have a structure in which the cathode terminal and the anode terminal are located at adjacent sides of the battery cell.

The first type pouch-shaped battery cell, the second type pouch-shaped battery cell, and the third type pouch-shaped battery cell may be electrically connected to one another while being stacked in a mixed fashion.

The electrode assembly is configured to have a structure including a cathode, an anode, and a separator disposed between the cathode and the anode. The electrode assembly may be a stacked type electrode assembly, which is manufactured by sequentially stacking a cathode plate, a separator plate, and an anode plate such that the separator plate is disposed between the cathode plate and the anode plate, a wound type electrode assembly, which is manufactured by sequentially stacking a sheet type cathode, a sheet type separator, and a sheet type anode and winding the sheet type cathode, the sheet type separator, and the sheet type anode such that the sheet type separator is disposed between the sheet type cathode and the sheet type anode, or a combination (stacked/folded) type electrode assembly, which is manufactured by arranging one or more polarized bodies selected from a group consisting of a cathode plate, an anode plate, and a stacked type electrode assembly on a sheet type separator and winding or folding the sheet type separator. The stacked/folded type electrode assembly may be manufactured using two or more sheet type separators.

Meanwhile, in order to achieve stable coupling between the battery cells stacked in the height direction on the basis of the plane, the battery pack may further include an adhesion means or a bonding means to couple the battery cells.

The adhesion means or the bonding means is not particularly restricted so long as the coupling between the battery cells is easily achieved. For example, the adhesion means or the bonding means may be an adhesive, a bonding agent, a double-sided adhesive tape, or a double-sided bonding tape.

According to circumstances, a spacer may be disposed between battery cells having different sizes and a system component of a device may be located at a portion of the spacer.

In the above structure, the spacer may be formed in a frame shape corresponding to outer circumferential regions of the battery cells facing each other.

An adhesion means or a bonding means of a predetermined thickness to couple the battery cells may be applied to the top and the bottom of the spacer or a double-sided adhesive or bonding tape may be attached to the top and the bottom of the spacer such that the spacer is easily mounted to a corresponding top and a corresponding bottom of the battery cells. Also, the battery cells may be fixed in position using ultraviolet (UV) gel or UV glue in a state in which the battery cells are stacked. The spacer may be a heat sink.

In accordance with another aspect of the present invention, there is provided a device comprising the battery pack with the above-stated construction as a power source.

An example of the device, for which the battery pack according to the present invention is used, may be selected from among a mobile phone, a portable computer, a smartphone, a smart pad, a laptop computer, a light electronic vehicle (LEV), an electric vehicle, a hybrid electric vehicle, a plug-in hybrid electric vehicle, and a power storage unit. However, the device is not limited thereto.

The structure of each device and a method of manufacturing each device are well known in the art to which the present invention pertains, and therefore, a detailed description thereof will be omitted.

Effects of the Invention

As is apparent from the above description, the battery pack according to the present invention includes a stair-like structure changed based on the radius of curvature of a device. Consequently, the present invention has an effect of increasing the capacity of the device per volume utilizing a dead space defined in the device unlike a conventional battery pack.

In addition, a system component of the device, in which the battery pack is mounted, is located at the stair-like structure, Consequently, the dead space of the device is further utilized.

DESCRIPTION OF DRAWINGS

The above and other objects, features and other advantages of the present invention will be more clearly understood from the following detailed description taken in conjunction with the accompanying drawings, in which.

DETAILED DESCRIPTION OF THE INVENTION

Now, preferred embodiments of the present invention will be described in detail with reference to the accompanying drawings. It should be noted, however, that the scope of the present invention is not limited by the illustrated embodiments, In FIGS. 2 to 7, there are shown battery packs configured such that three pouch-shaped battery cells 110, 120, and 130 having diffident lengths are stacked to form a stair-like structure at an electrode terminal non-formation region 150.

Figure 1A:
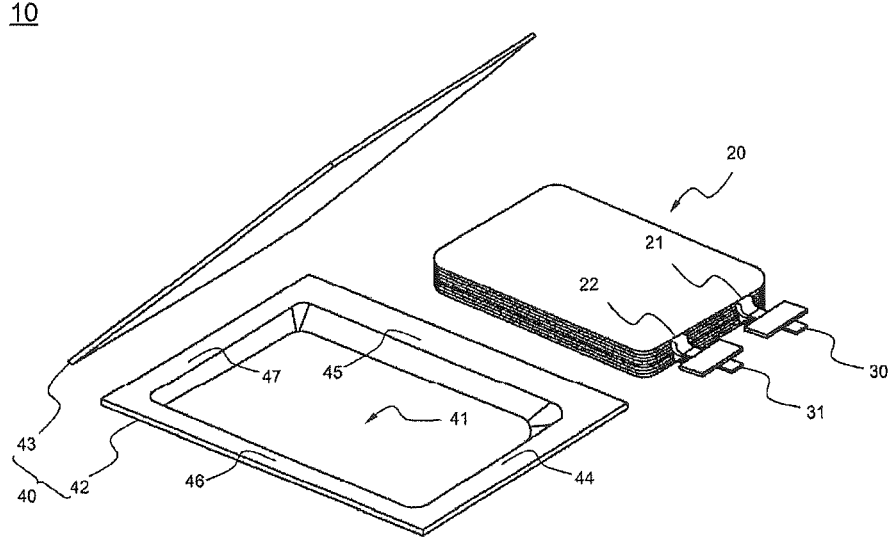
FIGS. 1A and 1B are exploded perspective views showing a conventional representative pouch-shaped secondary battery.
Figure 1B:
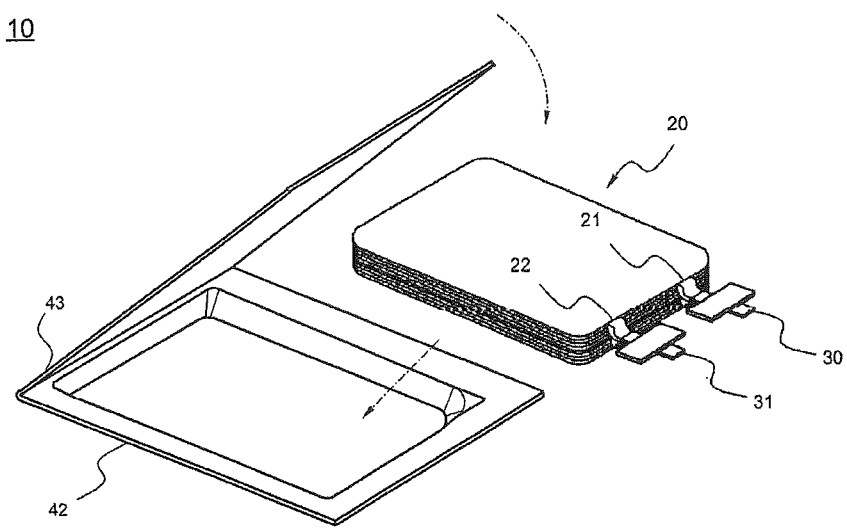
Figure 2:
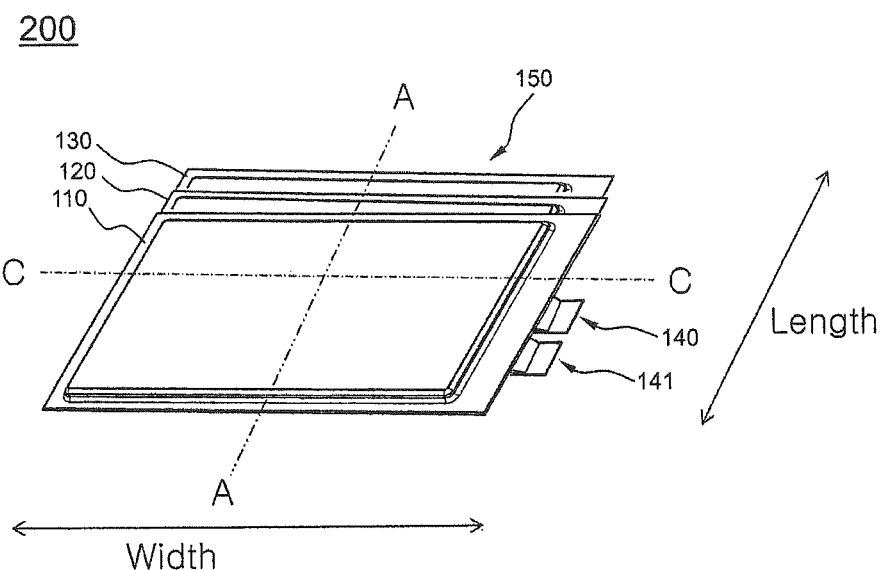
FIG. 2 is a perspective view showing a battery pack, including pouch-shaped battery cells each having angled corners, according to an embodiment of the present invention.

Referring to FIG. 2, there is shown a battery pack 200 configured to have a structure in which three first type pouch-shaped battery cells 110, 120, and 130 are stacked in the height direction on the basis of a plane parallel to the ground. A stair-like structure is formed at an electrode terminal non-formation region 150.

Also, electrode terminals of the pouch-shaped battery cells 110, 120, and 130 are connected to each other by welding in a stacked state to form electrode terminal connection parts 140 and 141. The electrode terminal connection parts 140 and 141 may be connected in series or in parallel. The electrode terminal connection parts 140 and 141 are formed at one side on the basis of a virtual center line C-C of the battery cell 130.

Figure 3:
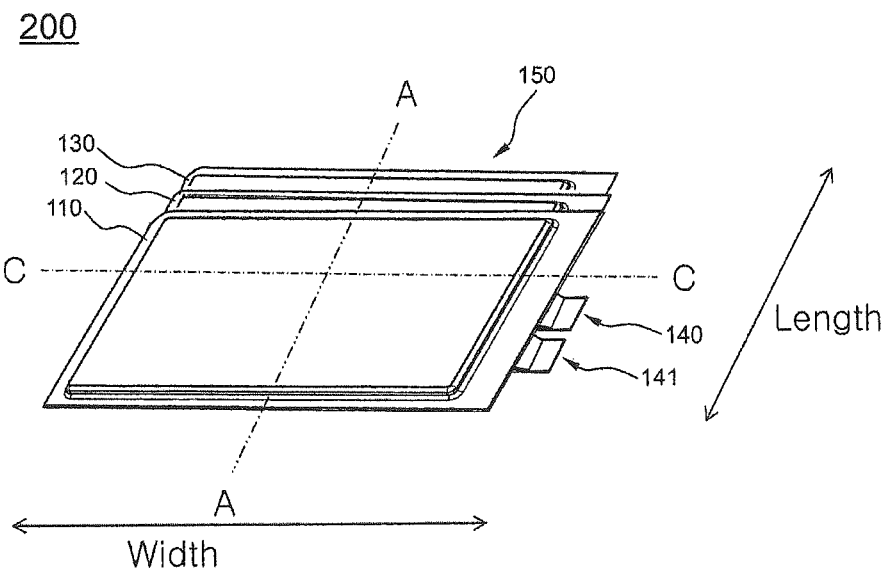
FIG. 3 is a perspective view showing a battery pack including pouch-shaped battery cells each having a curved corner as a modification of the battery pack shown in FIG. 2.

Referring to FIG. 3, there is shown a battery pack 200 including three first type pouch-shaped battery cells 110, 120, and 130 each having a curved corner. The radius of curvature of the curved corner may be properly adjusted based on a curved device.

Only one corner of each of the battery cells 110, 120, and 130 is curved. However, each of the battery cells 110, 120, and 130 may have two or more curved corners based on the shape of a curved device, which falls within the scope of the present invention.

Figure 4:
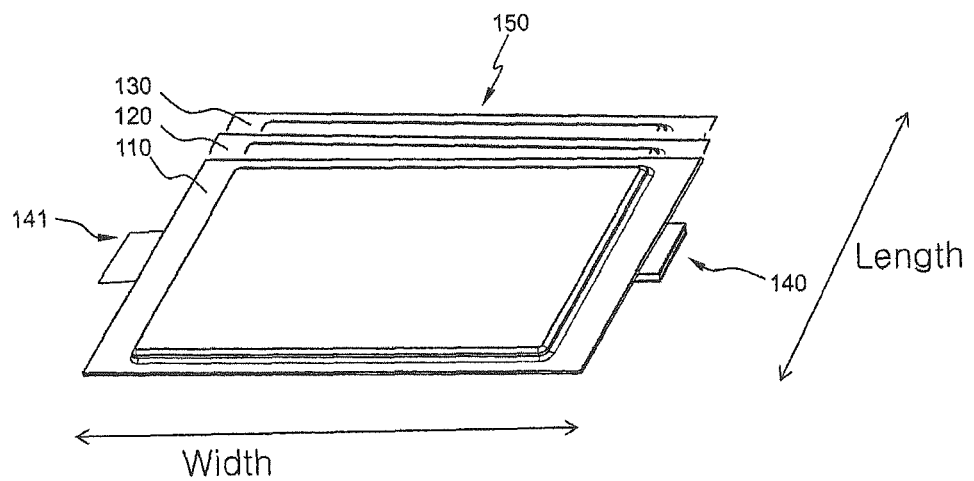
FIGS. 4 and 5 are perspective views showing a battery pack according to another embodiment of the present invention.

Referring to FIG. 4, there is shown a battery pack 200 configured to have a structure in which three second type pouch-shaped battery cells 110, 120, and 130 are stacked in the height direction on the basis of a plane parallel to the ground. In the same manner as in FIG. 2, a stair-like structure is formed at an electrode terminal non-formation region 150. Electrode terminal connection parts 140 and 141 may be connected in series or in parallel. According to circumstances, both or one of the electrode terminal connection parts 140 and 141 may be formed at one side on the basis of a virtual center line (not shown) of the battery cell 130.

Figure 5:
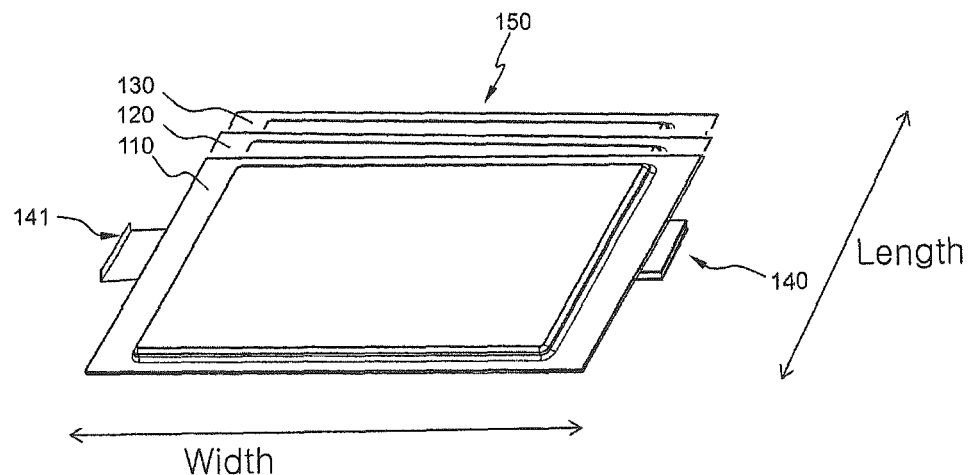

A battery pack shown in FIG. 5 is identical to the battery pack shown in FIG. 4 except that an electrode terminal, i.e. a cathode terminal or an anode terminal, of a battery cell 130, which is stacked at the lowermost end, is bent. The battery pack of FIG. 4 may be a small-sized battery pack which may be used as a power source of a device, such as a mobile phone, and the battery pack of FIG. 5 may be a middle or large-sized battery pack which may be used as a power source of an electric vehicle.

Figure 6:
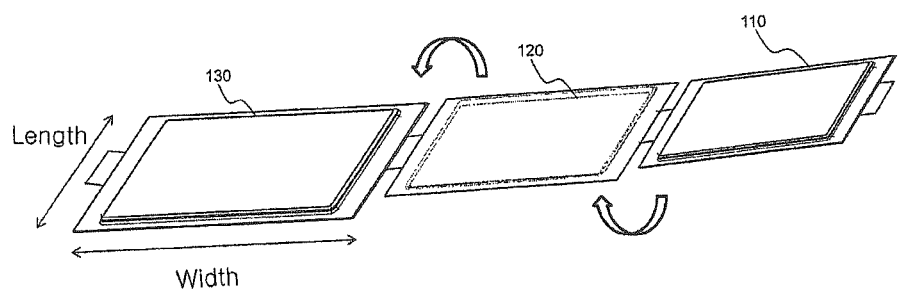
FIG. 6 is a view typically showing a method of manufacturing the battery pack shown in FIGS. 4 and 5.

FIG, 6 is a view typically showing a method of manufacturing the battery pack 200 shown in FIGS. 4 and 5. As shown in FIG. 6, the battery cell 120 is folded as indicated by an arrow such that the battery cell 120 is stacked on the battery cell 130, and then the battery cell 110 is folded as indicated by an arrow such that the battery cell 110 is stacked on the battery cell 120. As a result, the battery cells 110, 120, and 130 are folded in a Z shape.

Figure 7:
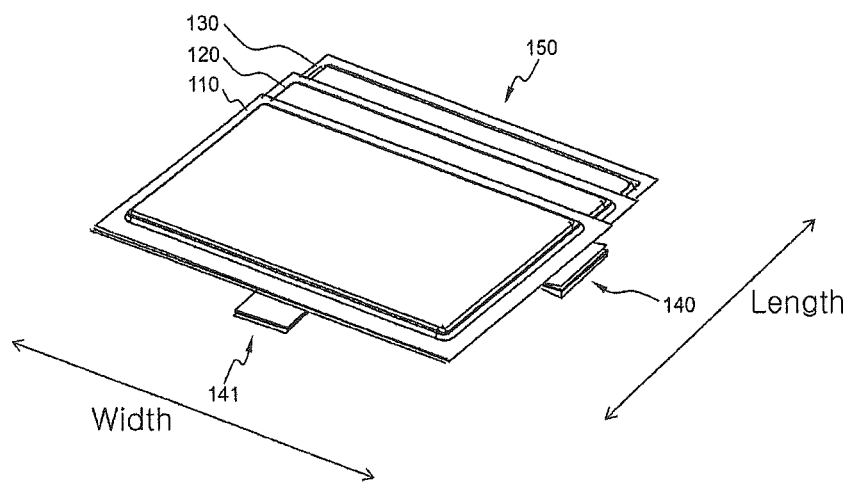
FIG. 7 is a perspective view showing a battery pack according to another embodiment of the present invention.

Referring to FIG. 7, there is typically shown a battery pack 200 configured to have a structure in which three third type pouch-shaped battery cells 110, 120, and 130, each of which has an angle of 90 degrees between a cathode terminal and an anode terminal, are stacked.

The battery pack of FIG. 7 is identical to the battery pack of FIGS. 2 and 4 except that the third type pouch-shaped battery cells 110, 120, and 130 are stacked.

Figure 8:
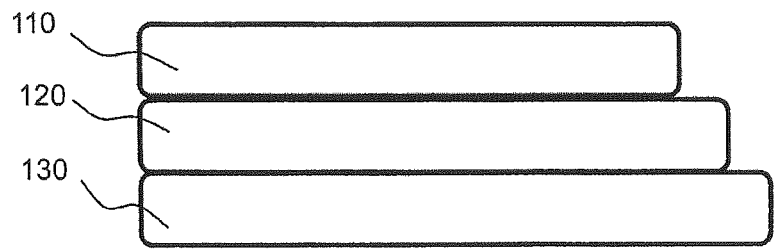
FIG. 8 is a sectional view taken along line A-A of FIG. 2.

FIG. 8 is a vertical sectional view taken along line A-A of FIG. 2.

Referring to FIG. 8, it can be clearly seen that the battery pack 200, in which the three battery cells 110, 120, and 130 having the same height and different lengths are stacked, has a stair-like structure formed at the electrode terminal non-formation region.

Also, referring to FIG. 8, it can be seen that the stair-like structure of the battery pack 200 is configured such that the height is gradually decreased and the width is gradually increased from the lower end to the upper end of the stair-like structure.

Figure 9:
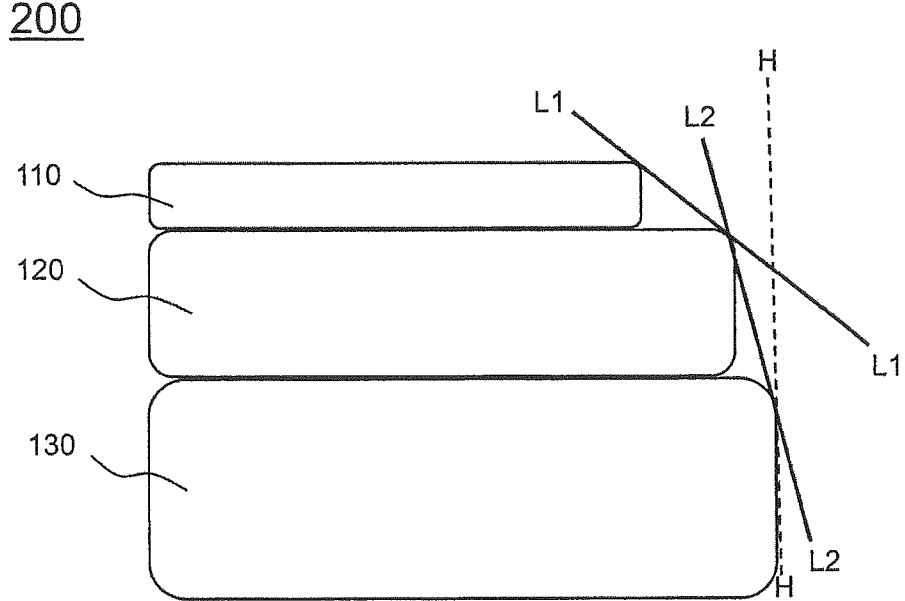
FIGS. 9 to 12 are views typically showing the battery pack according to the embodiment of the present invention using the sectional view of FIG. 8.

FIG. 9 is a sectional view showing a battery pack in which battery cells 110, 120, and 130 having different heights and lengths are stacked unlike FIG. 8.

A straight line L2-L2 tangent to the battery cell 130 having the greatest height and length and to the battery cell 120, stacked on the battery cell 130, having a height and a length less than those of the battery cell 130 is inclined at a predetermined angle to a central axis H-H.

Also, a straight line L1-L1 tangent to the battery cell 120 and to the battery cell 110, stacked on the battery cell 120, having a height and a length less than those of the battery cell 120 is inclined at another predetermined angle to the central axis H-H.

It can be seen from FIG, 9 that in the battery pack 200, in which the three battery cells 110, 120, and 130 having different heights and lengths are stacked, the angle between the straight line and the central axis is gradually increased from the lower end to the upper end of the stair-like structure, That is, the angle between the straight line L1-L1 and the central axis H-H is greater than that between the straight line L2-L2 and the central axis H-H.

Figure 10:
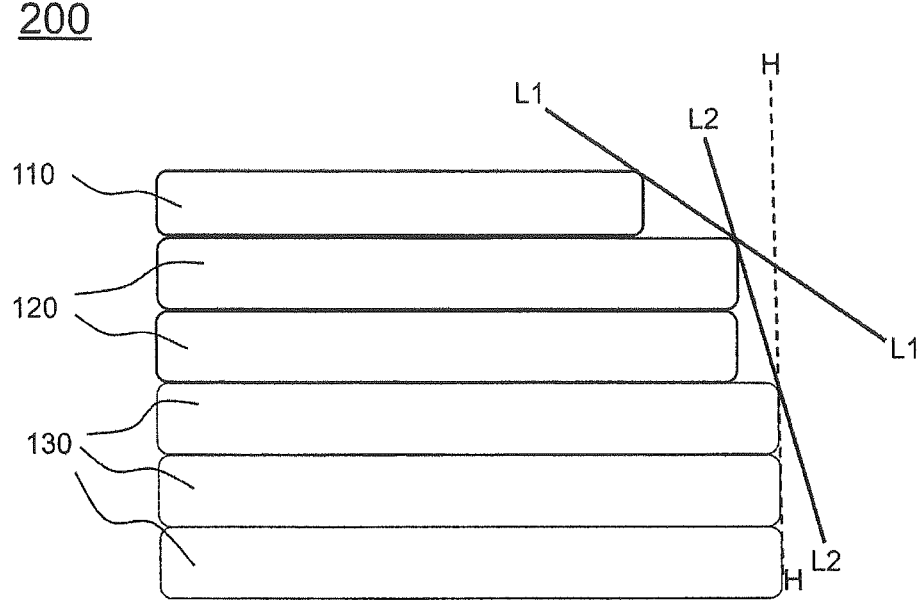

FIG. 10 typically shows a battery pack 200 configured to have a structure in which three battery cells 130 having the same length are located at the lowermost end, two battery cells 120 having the same size and a length less than that of the battery cells 130 are located on the battery cells 130, and a battery cell 110 having a length less than that of the battery cells 120 is located at the uppermost end.

Referring to FIG. 10, an angle between a straight line L1-L1 and a central axis H-H is greater than that between a straight line L2-L2 and the central axis H-H in the same manner as in FIG. 9.

In the above description, the battery packs including battery cells having different lengths and/or heights have been described in detail with reference to FIGS. 2 to 10. However, it can be easily understood from the above description that the present invention may be applied to a battery cell stack in which battery cells having different widths and/or heights are stacked or a battery cell stack in which battery cells having different widths, lengths, and heights are stacked.

Figure 11:
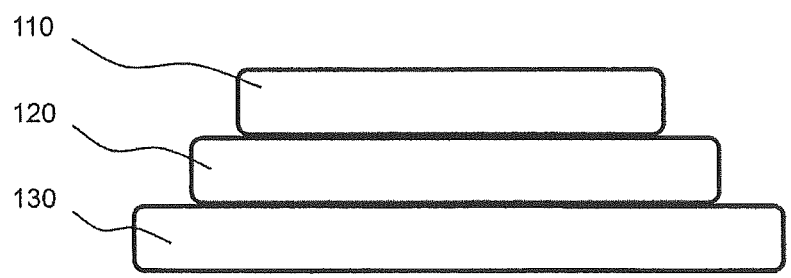
Figure 12:
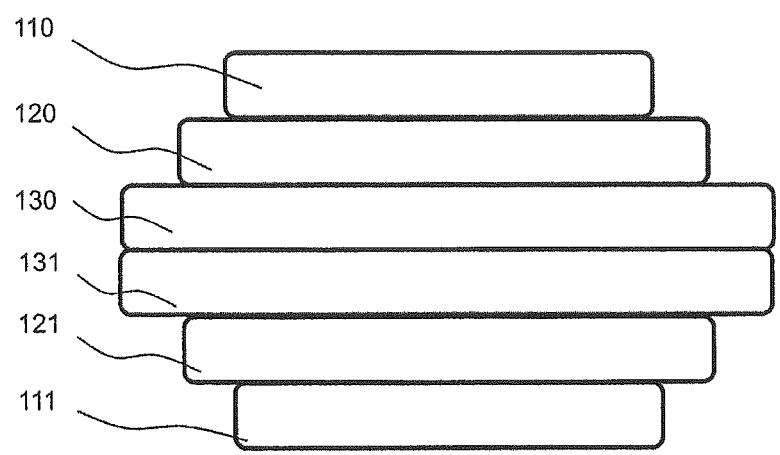

FIG. 11 is a vertical sectional view typically showing a battery pack configured to have a structure in which battery cells 110, 120, and 130 are stacked in the shape of a frustum of a quadrangular pyramid, and FIG. 12 is a vertical sectional view typically showing a battery pack configured to have a structure in which battery cells 110, 111, 120, 121, 130, and 131 are stacked in the shape of a frustum of an octagonal pyramid.

In the battery pack of FIG. 11 formed in the shape of the frustum of the quadrangular pyramid and the battery pack of FIG. 12 formed in the shape of the frustum of the octagonal pyramid, stair-like structures may be formed at both an electrode terminal formation region and an electrode terminal non-formation region. That is, in the battery pack of FIG. 11 formed in the shape of the frustum of the quadrangular pyramid and the battery pack of FIG. 12 formed in the shape of the frustum of the octagonal pyramid, the battery cells having different widths and lengths are stacked.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A method of manufacturing a battery cell stack, the method comprising the steps of:
   providing two or more battery cells connected in series, wherein one or more of the battery cells have different sizes than one or more other of the battery cells, wherein each battery cell is a pouch-shaped battery cell including a cell case in which an electrode assembly including a stack of cathodes, separators, and anodes is received, the cell case is sealed by thermal welding after the electrode assembly is impregnated with an electrolyte, and a cathode terminal and an anode terminal protrude outward from the cell case, wherein the cathode terminal and the anode terminal are formed at a first end of the battery cell and a second end of the battery cell opposite the first end, respectively; and
   stacking the battery cells in a height direction on the basis of a plane to form one or more stair-like structures each having a width and a height,
   wherein the two or more battery cells are connected such that a first battery cell is connected through one of its cathode and anode terminals to the cathode or anode terminal of a second battery cell at a first terminal connection, and the first battery cell is connected through the other of its cathode and anode terminals to the cathode or anode terminal of a third battery cell at a second terminal connection, and
   wherein the step of stacking includes folding the first battery cell at the first terminal connection such that it is stacked on the second battery cell, and folding the third battery cell at the second terminal connection such that it is stacked on the first battery cell, with the resulting stack having a Z shape in cross section.

2. The method according to claim 1, wherein the stair-like structures are configured such that the height of each stair-like structure is gradually decreased from a lower end to an upper end of the stair-like structures in the height direction on the basis of the plane.

3. The method according to claim 1, wherein the stair-like structures are configured such that the height of each stair-like structure is gradually increased from a lower end to an upper end of the stair-like structures in the height direction on the basis of the plane.

4. The method according to claim 1, wherein the stair-like structures are configured such that the width of each stair-like structure is gradually increased from a lower end to an upper end of the stair-like structures in the height direction on the basis of the plane.

5. The method according to claim 1, wherein the stair-like structures are configured such that the width of each stair-like structure is gradually decreased from a lower end to an upper end of the stair-like structures in the height direction on the basis of the plane.

6. The method according to claim 1, wherein the pouch-shaped battery cell is any one selected from a group consisting of a battery cell having a circular structure in plane; a battery cell having a polygonal structure in plane; a battery cell having a polygonal structure in plane, at least one corner of which is curved; and a battery cell having a polygonal structure in plane, at least one side of which is curved.

7. The method according to claim 1, wherein the step of stacking includes forming the stair-like structure at an electrode terminal non-formation region.

8. The method according to claim 1, wherein the step of stacking includes forming the stair-like structure at an electrode terminal formation region.

9. The method according to claim 1, wherein the step of stacking includes forming the battery cell stack in the shape of a frustum of a quadrangular pyramid.

10. The method according to claim 1, wherein the step of stacking includes forming the battery cell stack in the shape of a frustum of an octagonal pyramid.

11. The method according to claim 1, wherein the stair-like structures have the same height and different widths.

12. The method according to claim 1, wherein the stair-like structures have different widths and heights.

13. The method according to claim 12, wherein the width, the height, or the width and the height is configured based on a radius of curvature of a device in which the battery cell stack is mounted.

14. The method according to claim 1, further comprising the step of coupling adjacent battery cells with an adhesion means or a bonding means.

15. The method according to claim 1, further comprising the step of positioning a spacer between adjacent battery cells.

16. The method according to claim 15, further comprising the step of locating a system component of a device at a portion of the spacer.

17. The method according to claim 15, further comprising the step of forming the spacer in a frame shape corresponding to outer circumferential regions of the battery cells facing each other.

18. The method according to claim 15, further comprising the step of coupling adjacent battery cells with an adhesion means or a bonding means of a predetermined thickness.

19. The method according to claim 18, wherein the step of coupling includes applying the adhesion means or the bonding means to a top and a bottom of the spacer or attaching a double-sided adhesive tape to the top and the bottom of the spacer.

20. The method according to claim 1, wherein the step of stacking includes stacking the battery cells in a direction opposite to the height direction symmetrically to the battery cells stacked in the height direction on the basis of the plane.

21. A method of manufacturing and mounting a battery cell stack in a device, the method comprising the steps of:
providing two or more battery cells connected in series, wherein one or more of the battery cells have different sizes than one or more other of the battery cells, wherein each battery cell is a pouch-shaped battery cell including a cell case in which an electrode assembly including a stack of cathodes, separators, and anodes is received, the cell case is sealed by thermal welding after the electrode assembly is impregnated with an electrolyte, and a cathode terminal and an anode terminal protrude outward from the cell case, wherein the cathode terminal and the anode terminal are formed at a first end of the battery cell and a second end of the battery cell opposite the first end, respectively;
stacking the battery cells in a height direction on the basis of a plane to form one or more stair-like structures each having a width and a height; and
mounting the battery cell stack in a device as a power source,
wherein the two or more battery cells are connected such that a first battery cell is connected through one of its cathode and anode terminals to the cathode or anode terminal of a second battery cell at a first terminal connection, and the first battery cell is connected through the other of its cathode and anode terminals to the cathode or anode terminal of a third battery cell at a second terminal connection, and
wherein the step of stacking includes folding the first battery cell at the first terminal connection such that it is stacked on the second battery cell, and folding the third battery cell at the second terminal connection such that it is stacked on the first battery cell, with the resulting stack having a Z shape in cross section.

22. The method according to claim 21, further comprising the step of locating a system component of the device at the stair-like structure.

23. The method according to claim 21, further comprising the step of locating the stair-like structure at a curved portion of the device.

24. The method according to claim 21, wherein a width, a height, or the width and the height of the stair-like structures is configured based on a radius of curvature of the device.

25. The method according to claim 21, wherein the device is selected from among a mobile phone, a portable computer, a smartphone, a smart pad, a laptop computer, a light electronic vehicle, an electric vehicle, a hybrid electric vehicle, a plug-in hybrid electric vehicle, and a power storage unit.

* * * * *